(12) United States Patent
Sasaki et al.

(10) Patent No.: US 10,807,546 B2
(45) Date of Patent: Oct. 20, 2020

(54) VEHICULAR CIRCUIT BODY

(71) Applicant: YAZAKI CORPORATION, Tokyo (JP)

(72) Inventors: Noriaki Sasaki, Shizuoka (JP); Yasuyuki Saito, Shizuoka (JP); Taku Furuta, Shizuoka (JP); Yukinari Naganishi, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/231,503

(22) Filed: Dec. 22, 2018

(65) Prior Publication Data

US 2019/0126862 A1 May 2, 2019

Related U.S. Application Data

(63) Continuation of application No. PCT/JP2017/023314, filed on Jun. 23, 2017.

(30) Foreign Application Priority Data

Jun. 24, 2016 (JP) .................. 2016-125287

(51) Int. Cl.
*B60R 16/023* (2006.01)
*B60R 16/02* (2006.01)
(Continued)

(52) U.S. Cl.
CPC .......... *B60R 16/0238* (2013.01); *B60R 16/02* (2013.01); *B60R 16/0215* (2013.01);
(Continued)

(58) Field of Classification Search
CPC ... B60R 16/033; B60R 16/02; B60R 16/0239; B60R 16/0215; B60R 16/03;
(Continued)

(56) References Cited

U.S. PATENT DOCUMENTS 3,715,627 A 2/1973 D'Ausilio
5,324,203 A 6/1994 Sano et al.
(Continued)

FOREIGN PATENT DOCUMENTS

DE  41 02 659 A1 8/1992
DE  10 2012 200 979 A1 7/2013
(Continued)

OTHER PUBLICATIONS

US 5,875,923 A1, 04/2005, Egawa et al. (withdrawn)
(Continued)

*Primary Examiner* — Anatoly Vortman
(74) *Attorney, Agent, or Firm* — Kenealy Vaidya LLP

(57) ABSTRACT

The present invention pertains to a vehicular circuit body composed mainly a backbone trunk line portion provided in a vehicle and a plurality of backbone control boxes. An electrical connection path is realized with a structure which is simplified like a spine by connecting branch line sub-harnesses to backbone control boxes. An electrical connection between an engine room and a vehicle interior is performed by arranging a main power source cable and a part of a branch line sub-harness so as to penetrate a dash panel. Thus, it is possible to easily arrange the vehicular circuit body without reducing sealing performance of a portion penetrating the dash panel.

6 Claims, 3 Drawing Sheets

(51) Int. Cl.
  *H01B 7/00* (2006.01)
  *B60R 16/03* (2006.01)
  *B60K 37/00* (2006.01)
  *B60L 1/00* (2006.01)

(52) U.S. Cl.
  CPC .............. *B60R 16/03* (2013.01); *H01B 7/00* (2013.01); *H01B 7/0045* (2013.01); *B60K 37/00* (2013.01); *B60L 1/00* (2013.01)

(58) Field of Classification Search
  CPC . B60R 16/0238; B60R 16/0207; B60K 37/00; H04L 12/42; H04L 67/12; H04L 12/10; H04L 12/66; H01B 7/0045; H01R 9/2483; H01R 2201/26; H01R 13/64; H01R 13/62; H01R 13/44; H02G 3/32; H02G 3/081
  USPC ....................................................... 361/622
  See application file for complete search history.

(56) References Cited

U.S. PATENT DOCUMENTS

| | | | |
|---|---|---|---|
| 5,623,169 | A | 4/1997 | Sugimoto et al. |
| 5,675,189 | A * | 10/1997 | Anma ................ B60R 16/0315 307/9.1 |
| 5,759,050 | A | 6/1998 | Matsuoka et al. |
| 5,818,673 | A | 10/1998 | Matsumaru et al. |
| 5,990,573 | A | 11/1999 | Granitz et al. |
| 6,127,741 | A * | 10/2000 | Matsuda .................... H02J 1/08 307/10.6 |
| 6,182,807 | B1 | 2/2001 | Saito et al. |
| 6,291,770 | B1 | 9/2001 | Casperson |
| 6,494,723 | B2 | 12/2002 | Yamane et al. |
| 6,650,345 | B1 | 11/2003 | Saito et al. |
| 6,791,207 | B2 * | 9/2004 | Yoshida .............. B60R 16/0315 307/10.1 |
| 6,935,790 | B2 | 8/2005 | Ozaki |
| 6,945,704 | B2 | 9/2005 | Yamaguchi |
| 7,039,511 | B1 | 5/2006 | Kreuz et al. |
| 7,286,044 | B2 * | 10/2007 | Yanagida ................ H04B 3/548 307/10.1 |
| 7,423,519 | B2 * | 9/2008 | Yanagida ................ H04B 3/548 340/12.32 |
| 7,551,999 | B2 | 6/2009 | Uraki |
| 7,833,033 | B2 | 11/2010 | McMahon et al. |
| 7,852,206 | B2 | 12/2010 | Yanagida et al. |
| 8,248,971 | B2 | 8/2012 | Goto et al. |
| 8,304,928 | B2 * | 11/2012 | Nagasawa ........... B60R 16/0315 307/9.1 |
| 8,929,732 | B2 | 1/2015 | Yuki et al. |
| 9,505,358 | B2 * | 11/2016 | Ichikawa ............ B60R 16/0207 |
| 9,825,394 | B2 * | 11/2017 | Naganishi ........... B60R 16/0207 |
| 10,266,130 | B2 * | 4/2019 | Saito ........................ H02G 3/16 |
| 2001/0023786 | A1 | 9/2001 | Maynard et al. |
| 2002/0113441 | A1 | 8/2002 | Obayashi |
| 2003/0215235 | A1 | 11/2003 | Norizuki et al. |
| 2004/0077207 | A1 | 4/2004 | Ice |
| 2004/0227402 | A1 | 11/2004 | Fehr et al. |
| 2006/0031590 | A1 | 2/2006 | Monette et al. |
| 2006/0197378 | A1 | 9/2006 | Nagasawa et al. |
| 2009/0015976 | A1 * | 1/2009 | Hara ...................... B60R 16/023 361/64 |
| 2010/0131816 | A1 | 5/2010 | Yamamoto et al. |
| 2010/0215043 | A1 | 8/2010 | Hisada |
| 2011/0088944 | A1 | 4/2011 | Ogue et al. |
| 2012/0290692 | A1 * | 11/2012 | Reich .................... H04L 12/437 709/220 |
| 2012/0305308 | A1 | 12/2012 | Toyama et al. |
| 2015/0241498 | A1 | 8/2015 | Watanabe |
| 2015/0308998 | A1 | 10/2015 | Suzuki et al. |
| 2015/0309163 | A1 | 10/2015 | Van Der Velde et al. |
| 2015/0349471 | A1 | 12/2015 | Maki et al. |
| 2015/0360627 | A1 | 12/2015 | Sasaki et al. |
| 2016/0059708 | A1 | 3/2016 | Iwasaki et al. |
| 2016/0177907 | A1 | 6/2016 | Betscher et al. |
| 2017/0057434 | A1 | 3/2017 | Nohara et al. |
| 2017/0201584 | A1 | 7/2017 | Endo |

FOREIGN PATENT DOCUMENTS

| | | |
|---|---|---|
| DE | 10 2015 216 311 A1 | 3/2016 |
| EP | 0 507 225 A1 | 10/1992 |
| JP | 64-7712 U | 1/1989 |
| JP | 2-25343 U | 2/1990 |
| JP | 5-71058 U | 9/1993 |
| JP | 6-171438 A | 6/1994 |
| JP | 7-335367 A | 12/1995 |
| JP | 8-2290 A | 1/1996 |
| JP | 8-273718 A | 10/1996 |
| JP | 9-134307 A | 5/1997 |
| JP | 9-275632 A | 10/1997 |
| JP | 10-84619 A | 3/1998 |
| JP | 11-154566 A | 6/1999 |
| JP | 2000-78179 A | 3/2000 |
| JP | 2003-32853 A | 1/2003 |
| JP | 2003-175781 A | 6/2003 |
| JP | 2003-218904 A | 7/2003 |
| JP | 2003-332981 A | 11/2003 |
| JP | 2004-306697 A | 11/2004 |
| JP | 2005-78962 A | 3/2005 |
| JP | 2006-6069 A | 1/2006 |
| JP | 2006-191727 A | 7/2006 |
| JP | 2006-220857 A | 8/2006 |
| JP | 2007-201932 A | 8/2007 |
| JP | 2007-305379 A | 11/2007 |
| JP | 2008-49982 A | 3/2008 |
| JP | 2008-284981 A | 11/2008 |
| JP | 2008-306592 A | 12/2008 |
| JP | 2009-94731 A | 4/2009 |
| JP | 2009-286288 A | 12/2009 |
| JP | 2010-12868 A | 1/2010 |
| JP | 2010-120545 A | 6/2010 |
| JP | 2011-20523 A | 2/2011 |
| JP | 2011-165354 A | 8/2011 |
| JP | 2014-191997 A | 10/2014 |
| JP | 2015-113101 A | 6/2015 |
| JP | 2015-196447 A | 11/2015 |
| JP | 2015-227089 A | 12/2015 |
| JP | 2016-4686 A | 1/2016 |
| JP | 2016-19176 A | 2/2016 |
| JP | 2016-43882 A | 4/2016 |
| JP | 2016-110811 A | 6/2016 |
| WO | 00/38953 | 7/2000 |
| WO | 00/52836 A1 | 9/2000 |
| WO | 2004/089696 A1 | 10/2004 |
| WO | 2004/103771 A2 | 12/2004 |
| WO | 2007/056696 A2 | 5/2007 |
| WO | 2014/077330 A1 | 5/2014 |
| WO | 2015/186837 A1 | 12/2015 |

OTHER PUBLICATIONS

International Search Report and Written Opinion of the International Search Report for PCT/JP2017/023266 dated Sep. 19, 2017.
International Search Report and Written Opinion of the International Search Report for PCT/JP2017/023307 dated Sep. 19, 2017.
International Search Report and Written Opinion of the International Search Report for PCT/JP2017/023267 dated Sep. 19, 2017.
International Search Report and Written Opinion of the International Search Report for PCT/JP2017/023269 dated Sep. 19, 2017.
International Search Report and Written Opinion of the International Search Report for PCT/JP2017/023303 dated Sep. 19, 2017.
International Search Report and Written Opinion of the International Search Report for PCT/JP2017/023305 dated Sep. 19, 2017.
International Search Report and Written Opinion of the International Search Report for PCT/JP2017/023306 dated Sep. 19, 2017.
International Search Report and Written Opinion of the International Search Report for PCT/JP2017/023309 dated Sep. 19, 2017.
International Search Report and Written Opinion of the International Search Report for PCT/JP2017/023312 dated Sep. 19, 2017.

(56) References Cited

OTHER PUBLICATIONS

International Search Report and Written Opinion of the International Search Report for PCT/JP2017/023313 dated Sep. 19, 2017.
International Search Report and Written Opinion of the International Search Report for PCT/JP2017/023314 dated Sep. 19, 2017.
International Search Report and Written Opinion of the International Search Report for PCT/JP2017/023315 dated Sep. 19, 2017.
International Search Report and Written Opinion of the International Search Report for PCT/JP2017/023316 dated Sep. 19, 2017.

* cited by examiner

VEHICULAR CIRCUIT BODY

CROSS-REFERENCE TO RELATED APPLICATIONS

This is a continuation of International Application No. PCT/JP2017/023314 filed on Jun. 23, 2017, and claims priority from Japanese Patent Application No. 2016-125287 filed on Jun. 24, 2016, the entire content of which is incorporated herein by reference.

TECHNICAL FIELD

The present invention relates to a vehicular circuit body routed in a vehicle.

BACKGROUND ART

In a vehicle, for example, source power is required to be appropriately supplied to a large number of various electric components from an alternator (generator) or a battery which is a main power source. A system used to supply such source power is also required to have a function of switching between ON and OFF of the supply of power as necessary, or a function of cutting off a current for each system in a case where an excessive current flows through an electric component.

In a general vehicle, a wire harness which is an aggregate of a plurality of electric wires is routed on the vehicle, and a main power source is connected to electric components at each location via the wire harness so that power is supplied thereto. Generally, a junction block is used to distribute source power to a plurality of systems, a relay box is used to control ON and OFF of the supply of power for each system, or a fuse box is used to protect each electric wire or a load of the wire harness.

For example, a wire harness disclosed in PTL 1 includes a network transmission path and a circuit for providing power, GND and other signals. Further, The wire harness includes a wire harness trunk line, a sub-wire harness, an optional sub-wire harness, and a network hub device.

CITATION LIST

Patent Literature

[PTL 1]: JP-A-2005-78962

SUMMARY OF THE INVENTION

Technical Problem

In recent years, as the number of electric components mounted on a vehicle body increases, the structure of the wire harness routed on the vehicle body tends to be complicated. Therefore, for example, as disclosed in Patent Document 1, a wire harness trunk line, a sub-wire harness, and an optional sub-wire harness are combined to form a wire harness having a complicated shape as a whole, and the wire harness may be connected with various with various electric components disposed at various places on the vehicle body.

Since a diameter of each electric wire forming the wire harness or the number of electric wires increases due to an increase in the number of electric components mounted on a vehicle, there is a tendency that a size of the entire wire harness increases or a weight thereof increases. The types and the number of components of wire harness to be manufactured increase due to a difference between vehicle models mounted with a wire harness or increases in types of optional electric components mounted on a vehicle, and thus it is difficult to share the components forming the wire harness, and component cost or manufacturing cost increases.

In a work process of manufacturing a wire harness, in order to finish the wire harness in a predetermined routing shape, a bundle of a plurality of electric wires forming the wire harness is pulled around over a long distance along a path which is designated in advance, and thus a lot of work time is required. Since almost all of electric wires are collected at a trunk line portion of the wire harness, the number of bundled electric wires increases, and thus a weight thereof increases.

For example, in a case where a new electric component which is not expected at initial design is mounted on a vehicle, a new electric wire is required to be added to a wire harness in order to secure a path along which a special signal is transmitted between the electric component and another electric component or to supply source power thereto. However, a wire harness has a complex structure or shape, and it is very difficult to add other electric wires to the existing wire harness in the future. Therefore, a new wire harness having differing type or component number is required to be designed so as to be manufactured as a separate product.

Therefore, as a substitute for the wire harness of the related art, it is conceivable to form a trunk line using a structure having a special shape such as a spine (backbone), for example. Then, a large number of branch lines are connected so as to branch off from this trunk line, and accessories, that is, various electric components are connected to each of the branch lines. As a result, it is possible to simplify the basic configuration, and to easily add and change of the circuit.

However, the trunk line of a spine-like structure needs to allow the passage of a very large power source current. Further, it is necessary to include a main power source line, a backup power source line, a ground line, a communication line, and the like in the trunk line. Therefore, it is conceivable to form a trunk line by stacking, for example, band-like metal plates or the like in the thickness direction. Since the trunk line having such a configuration is difficult to bend in a specific direction, there is a problem in workability at the time of routing depending on the location of the vehicle.

For example, since the main battery and the alternator, which is the main power source of the vehicle, are in the engine room and most of the accessories are inside the vehicle interior (occupant compartment), the trunk line used for connecting the main power source and each accessory needs to be routed so as to extend between the inside of the engine room and the inside of the vehicle interior. Since the dash panel exists as a partition wall between the inside of the engine room and the inside of the vehicle interior, the trunk line needs to be provided to penetrate through the dash panel.

However, it is difficult to provide a trunk line having a large sectional area and also having restrictions on the bending direction so as to penetrate through the dash panel. In order to maintain the comfort in the vehicle interior, the dash panel needs to have functions of insulating vibration from the engine room, reducing vibration and noise from a suspension, blocking high heat, noise, smell, and the like. For that reason, it is necessary to completely seal the periphery of the portion where the trunk line penetrates through the dash panel. In the case of a trunk line having a large sectional area and restrictions on the bending direction, it is difficult to provide the trunk line so as to penetrate the dash panel in a completely sealed state.

The present invention has been made in consideration of the above-described circumstances, and an object thereof is to provide a vehicular circuit body in which a structure for electrical connection between various electric components and a power source on a vehicle and between the electric components, particularly, a configuration of a trunk line portion is simplified and a new electric wire may be easily added.

Solution to Problem

In order to achieve the above object, a vehicular circuit body according to the present invention is characterized by the following (1) to (5).

(1) A vehicular circuit body provided in a vehicle, including:

a plurality of control units that are disposed in a first region;

a trunk line that is disposed in the first region, and that connects the plurality of control units to each other; and a first branch line that connects one of the plurality of control units to an accessory that is disposed in the first region or a second region that is different from the first region, in which the trunk line has a power source line having a predetermined current capacity and a communication line having a predetermined communication capacity, power is supplied from a power source to the power source line, and the control unit distributes the power that is supplied to the power source line, to the first branch line.

(2) In the vehicular circuit body according to the above (1), the first branch line has a communication line, and extends from the first region to the second region.

(3) In the vehicular circuit body according to the above (1) or (2), the vehicular circuit body further includes a second branch line that is able to connect to the control unit, in which the second branch line has at least a power source line, and extends from the first region to the second region, the control unit includes a relay circuit that performs relaying between the power source line of the trunk line, and the power source line of the second branch line, and a sectional area of the second branch line is smaller than a sectional area of the trunk line.

(4) In the vehicular circuit body according to the above (3), the relay circuit has an interrupting function with respect abnormality of a current which flows between the trunk line and the second branch line.

(5) In the vehicular circuit body according to any one of the above (1) to (4), the first region is a vehicle interior of the vehicle, and the second region is an engine room of the vehicle or a movable body that configures a part of a vehicle body.

According to the vehicular circuit body having the above configuration (1), it is possible to form a routing path of a relatively simple structure in a shape like a spine by using the trunk line and the first branch line. Since the trunk line is disposed in the first region and the portion extending across the first region and the second region which are different from each other may be connected via the first branch line, even in a case where the trunk line is thick and is unlikely to be bent, the routing work becomes easy. For example, even in a case where a dash panel exists at the boundary between the first region and the second region, since the portion penetrating through the dash panel may be connected by using the first branch line, it is easy to provide the portion in a state where the first region and the second region are sealed.

According to the vehicular circuit body having the above configuration (2), the first branch line including the communication line may be used in the case of connecting a portion extending across the first region and the second region. Since the first branch line includes the communication line, communication between the control unit existing in the first region and the accessory or the like existing in the second region is performed, and it is possible to control the accessory.

According to the vehicular circuit body having the above configuration (3), since the relay circuit is included in the control unit, it is possible to mutually connect the trunk line and the second branch line having different shapes from each other. Therefore, for example, like a portion penetrating through the dash panel, even in a portion which is unlikely to be routed in a completely sealed state, it is possible to ensure sealing performance by using the second branch line having a smaller sectional area than that of the trunk line.

According to the vehicular circuit body having the above configuration (4), in a case where an abnormal current flows, the connection between the trunk line and the second branch line is cut off, and it is possible to prevent occurrence of overheating or the like in advance. Since this cutoff function is installed inside the control unit, it is easy to digitize the cutoff control.

According to the vehicular circuit body having the above configuration (5), even in a case where the trunk line and the control unit are provided in the vehicle interior and the accessory is provided in regions such as the engine room and the door other than the vehicle interior, it is possible to connect the control unit and the accessory by using the branch line.

Advantageous Effects of Invention

According to the vehicular circuit body of the present invention, it is possible to simplify the structure for electrical connection between various electric components and the power source on the vehicle and for the electrical connection between the electric components, particularly the configuration of the trunk line portion and to easily add new electric wires. Further, since the trunk line is not provided across the region, it is possible to easily provide an electrical connection portion.

As mentioned above, the present invention has been described briefly. Further, details of the present invention will become more apparent by reading through modes for carrying out the invention (hereinafter, referred to as "embodiments") described below with reference to the accompanying drawings.

DESCRIPTION OF EMBODIMENTS

Specific embodiments relating to the present invention will be described below with reference to drawings.

Figure 1:
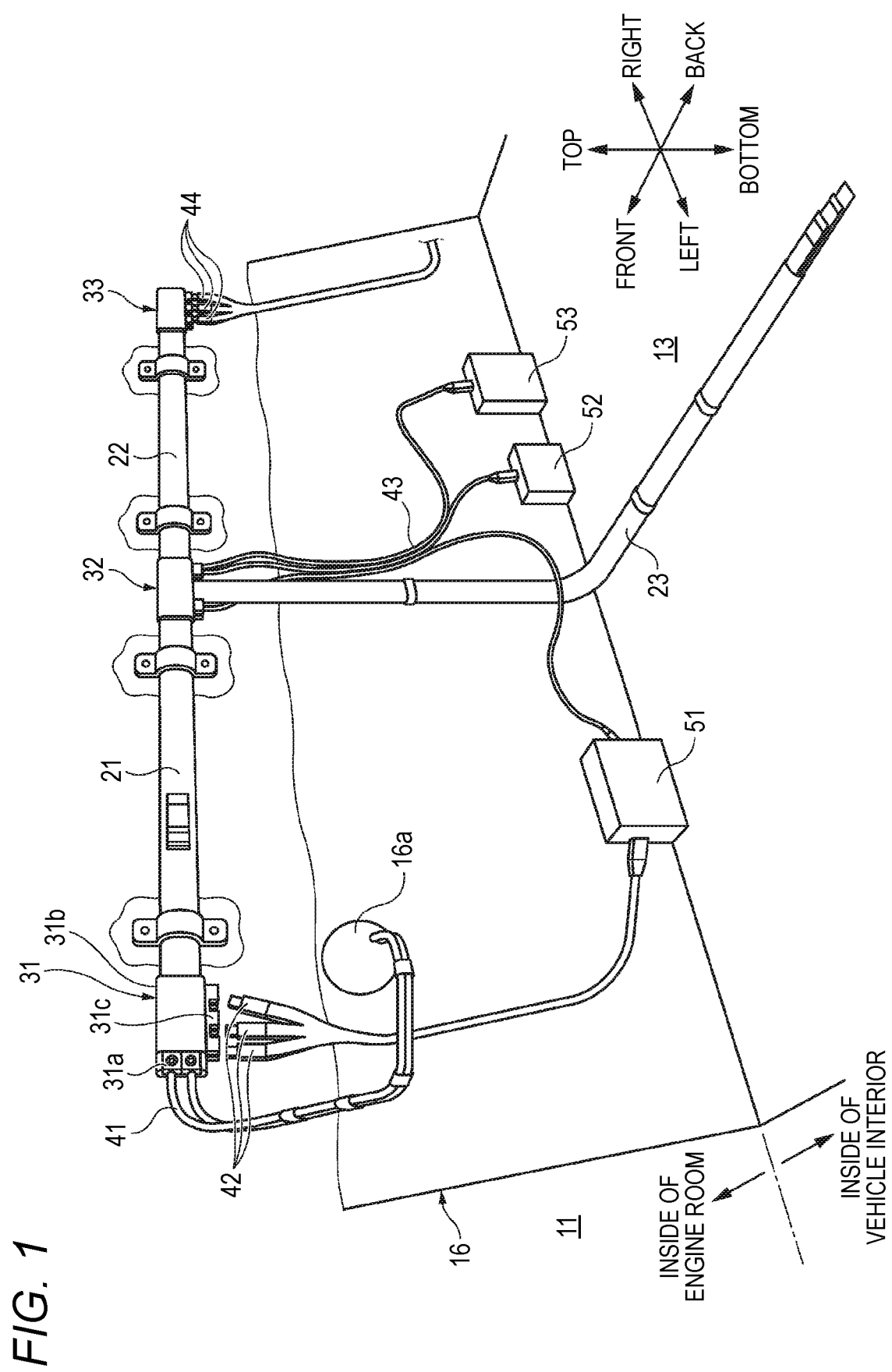
FIG. 1 is a perspective view illustrating a configuration example of main portions of an on-vehicle device including a vehicular circuit body according to an embodiment of the present invention.

First, a configuration example of main portions will be described. FIG. 1 illustrates a configuration example of the main portions of an on-vehicle device including a vehicular circuit body according to an embodiment of the present invention. The components in the vicinity of one backbone control box 31 illustrated in FIG. 1 are extracted and illustrated in FIG. 2.

The vehicular circuit body illustrated in FIG. 1 supplies power of a main power source such as an on-vehicle battery to auxiliary devices of various parts of a vehicle body, that is, various electric components and is used as a transmission line necessary for exchanging signals between electric components. That is, although the vehicular circuit body is functionally similar to a general wire harness, the structure thereof is largely different from the general wire harness.

The on-vehicle device illustrated in FIG. 1 represents a configuration on the vehicle interior side in the vicinity of a dash panel 16 that partitions an engine room 11 and a vehicle interior (occupant compartment) 13 of the vehicle body. As illustrated in FIG. 1, a lean hose (not illustrated) as a reinforcement material is provided on an instrument panel portion (portion of the instrument panel) slightly behind the dash panel 16 so as to extend in the left-right direction of the vehicle body. In the vicinity of the lean hose, main components of the vehicular circuit body is disposed.

The vehicular circuit body illustrated in FIG. 1 includes a plurality of backbone trunk line portions 21, 22, and 23 and a plurality of backbone control boxes 31, 32, and 33. Each of the backbone trunk line portions 21, 22, and 23 includes a line such as a power source line, a ground line, a communication line, or the like. The power source line and the ground line in each backbone trunk line portion are configured by adopting a band-like metal material (for example, copper or aluminum) having a flat cross section and stacking these metal materials in the thickness direction in a state of being electrically insulated from each other. As a result, it is possible to allow the passage of a large current, and the bending process with respect to the thickness direction becomes relatively easy.

The backbone trunk line portions 21 and 22 are disposed linearly in the left-right direction so as to be substantially parallel to the lean hose at a position above the lean hose at a location along the surface of the dash panel 16. The backbone trunk line portion 23 is disposed substantially at the center in the left-right direction of the vehicle body and linearly extends in the vertical direction at a portion along the surface of the dash panel 16. The backbone trunk line portion 23 is bent in the thickness direction by approximately 90 degrees in the vicinity of the boundary between the dash panel 16 and the floor in the vehicle interior and is disposed so as to extend in the front-to-rear direction of the vehicle body along the floor in the vehicle interior.

The backbone control box 32 is disposed substantially at the center in the left-right direction of the vehicle body, the backbone control box 31 is disposed near the left end in the left-right direction, and the backbone control box 33 is disposed near the right end in the left-right direction.

The left end of the backbone trunk line portion 21 is connected to the right end of the backbone control box 31, and the right end of the backbone trunk line portion 21 is connected to the left end of the backbone control box 32. The left end of the backbone trunk line portion 22 is connected to the right end of the backbone control box 32, and the right end of the backbone trunk line portion 21 is connected to the left end of the backbone control box 33. The front end of the backbone trunk line portion 23 is connected to the lower end of the backbone control box 32.

That is, the backbone trunk line portions 21 to 23 and the backbone control boxes 31 to 33 are configured in a shape resembling a T shape as illustrated in FIG. 1. The internal circuits of the backbone trunk line portions 21 to 23 are in a state of being electrically connected with each other via the backbone control box 32.

Figure 2:
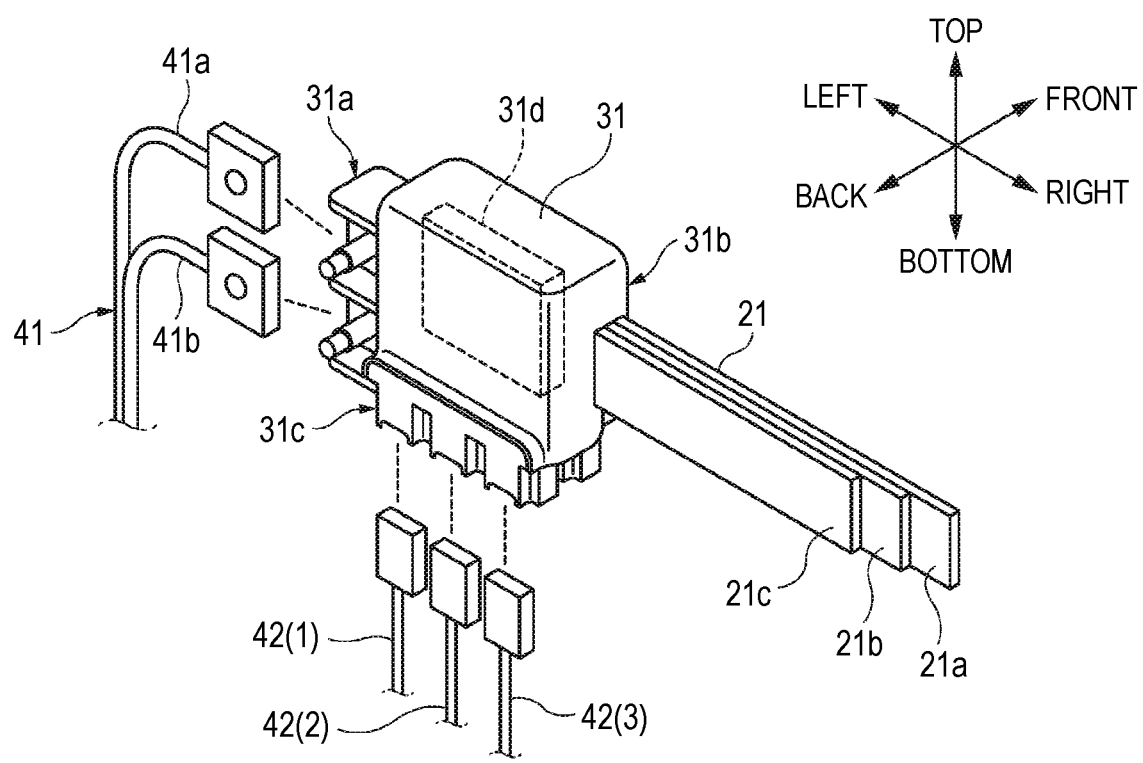
FIG. 2 is a perspective view illustrating a configuration in the vicinity of one backbone control box 31 shown in FIG. 1.

The backbone control box 31 disposed on the left side of the vehicle body is provided with a main power source connection portion 31a, a trunk line connecting portion 31b, and a branch line connection portion 31c. As illustrated in FIG. 2, a main power source cable 41 is connected to the main power connection portion 31a of the backbone control box 31, the left end of the backbone trunk line portion 21 is connected to the trunk line connection portion 31b, and a plurality of branch line sub-harnesses 42(1), 42(2), and 42(3) are respectively connected to the branch line connection portion 31c. In FIG. 1, since the branch line sub-harness as the first branch line is illustrated to be detachable from the backbone control box, the branch line sub-harness 42 is illustrated in a state of being separated from the backbone control box 31.

As illustrated in FIG. 2, the backbone trunk line portion 21 includes a power source line 21a, an earth line 21b, and a communication line 21c. The main power source cable 41 includes a power source line 41a and a ground line 41b.

Inside the backbone control box 31, a relay circuit 31d for connecting the power source system, the earth system, and the communication system of respective circuits between the main source supply cable 41, the backbone trunk line portion 21, and the branch line sub-harness 42 are included. The relay circuit 31d includes a semiconductor switch having functions of a fusible link and a relay. The fusible link shuts off the current in a case where an excessive power source current flows. The relay has a function of switching ON/OFF of conduction as necessary for each system. The relay circuit 31d is formed by circuits and bus bars formed on the printed circuit board in the backbone control box 31.

As illustrated in FIG. 2, the shape and structure of the backbone trunk line portion 21 and the main power source cable 41 are largely different, but by interposing the relay circuit 31d of the backbone control box 31, it is possible to easily connect the circuit of the backbone trunk line portion 21 and the circuit of the main power source cable 41.

The main power source cable 41 connects the terminals connected to the each tip of the power source line 41a and the ground line 41b to the terminals of the main power source connection portion 31a and fixing by using bolts and nuts so that these circuits may be connected. The power source line 21a and the earth line 21b of the backbone trunk line portion 21 are respectively connected to the circuit on the printed circuit board in the backbone control box 31 and fixed by using bolts and nuts. The communication line 21c is connected to a circuit on the printed circuit board in the backbone control box 31 by using a connector.

The connectors provided at the respective tips of the branch line sub-harnesses 42(1) to 42(3) are detachable with respect to the branch line connection portion 31c, and circuits may be connected as necessary. Each of the branch line sub-harnesses 42(1) to 42(3) is configured to include all of the power source line, earth line, communication line, or a part thereof.

As illustrated in FIG. 1, by combining the backbone trunk line portions 21 to 23 and the backbone control boxes 31 to 33 and connecting the various branch line sub-harnesses 42 to 44 to the backbone control boxes 31 to 33, it is possible to arrange various transmission lines with a simple structure similar to a spine (backbone).

For example, since it is possible to cope with various electric components to be mounted in vehicles as options or new electric components to be added by adding or changing the branch line sub-harnesses 42 to 44 to be connected to any of the backbone control boxes 31 to 33, there is no need to change the structure of the trunk line of the vehicular circuit body. In the present embodiment, it is assumed that the branch line sub-harnesses 42 to 44 are connected to the backbone control boxes 31 to 33, but for example, another branch line sub-harness (not illustrated) may be connected to appropriate relay points on the backbone trunk line portions 21 to 23.

In an actual on-vehicle device, for example, as illustrated in FIG. 1, an electronic control unit (ECU) 51 provided in the vehicle may be connected to the backbone control box 31 and other electric components via the branch line sub-harness 42. The electronic control units 51, 52, and 53 and other electric components may be connected to the backbone control box 32 via the branch line sub-harness 43. Further, various electric components may be connected to the backbone control box 33 via the branch line sub-harness 44. Each of the electronic control units 51, 52, and 53 may control other electric components on the vehicle via the communication lines of the branch line sub-harnesses 42, 43, and 44, the backbone control boxes 31 to 33, and the like.

On the other hand, the vehicular circuit body illustrated in FIG. 1 is required to perform electrical connection not only between electric components in the vehicle interior 13 but also between the main power source and electric components in the engine room 11. The dash panel 16 is disposed at a boundary between the engine room 11 and the vehicle interior 13, and a location where an electrical connection member penetrates through the dash panel 16 is required to be perfectly sealed. In other words, the dash panel is required to have functions of insulating vibration from the engine room, reducing vibration or noise from a suspension, and blocking heat, noise, and smell in order to maintain the vehicle interior to be comfortable.

However, for example, if a component which has a large sectional area and is hardly bent in directions other than a specific direction, such as the backbone trunk line portions 21 to 23, is configured to penetrate through the dash panel 16, it is considerably hard to seal the penetration location, and thus it is also difficult to perform routing work of a vehicular circuit body.

In the vehicular circuit body illustrated in FIG. 1, the backbone trunk line portions 21 to 23 and the backbone control boxes 31 to 33 which are main components are all disposed in a space on the vehicle interior 13 side, and thus the problem of the penetration location in the dash panel 16 may be easily solved.

Actually, as illustrated in FIG. 1, the main power source cable 41 connected to the left end of the backbone control box 31 is routed to pass through a penetration hole 16*a* of the dash panel 16, and a circuit of the main power source in the engine room 11 is connected to a power source circuit of the backbone control box 31 via the main power source cable 41. Thus, the power of the main power source may be supplied to the backbone control box 31. Since an easily bendable material may be used for the main power source cable 41, a sectional shape thereof may be made a circular shape, and a sectional area thereof may be made smaller than those of the backbone trunk line portions 21 to 23, the penetration hole 16*a* may be easily sealed, and thus it is also possible to prevent workability from degrading when routing work is performed. A grommet used in a related art may be used as the penetration hole 16*a*.

In a case where various electric components in the engine room 11 are connected to the vehicular circuit body of the vehicle interior 13, for example, a part of the branch line sub-harnesses 42 connected to the backbone control box 31 is provided to pass through the dash panel 16, or a part of the branch line sub-harnesses 44 connected to the backbone control box 33 is provided to pass through the dash panel 16, and thus a desired electrical connection path may be realized. In this case, since the branch line sub-harnesses 42 and 44 have small sectional areas and are easily bent, a location where the branch line sub-harnesses pass through the dash panel 16 may be easily sealed.

Since there is a main power source on the engine room 11 side, regarding the branch line sub-harnesses provided at portions penetrating through the dash panel 16, it is also possible to omit the power source line and ground line and limit the branch line sub-harness to only the communication line.

Figure 3:
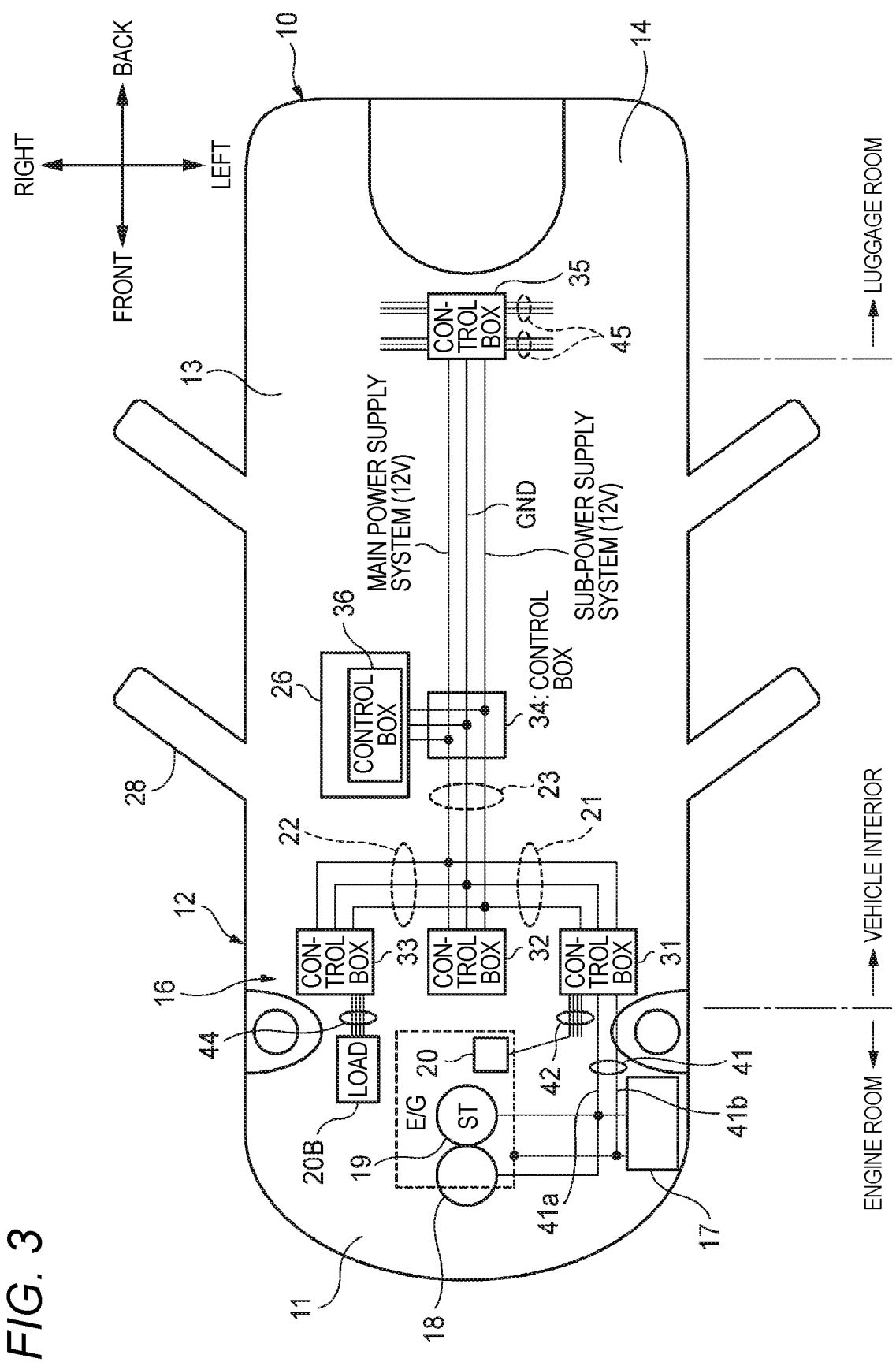
FIG. 3 is a plan view illustrating a configuration example of main portions of an on-vehicle device including the vehicular circuit body shown in FIG. 1.

Next, a configuration example of the entire on-vehicle device will be described. FIG. 3 illustrates an example of the configuration of the main portions of the on-vehicle device including the vehicle circuit body illustrated in FIG. 1. As illustrated in FIG. 3, a vehicle body 10 of this vehicle is formed of three sections of an engine room 11, a vehicle interior 13, and a luggage room 14. The vehicle interior 13 forms the first region of the present invention and is a region including at least an instrument panel portion 12 and the floor in the vehicle interior. In the present embodiment, the engine room 11 forms the second region of the present invention. The above-described dash panel 16 is installed at the boundary between the engine room 11 and the vehicle interior 13. The second region may be a movable body forming a part of the vehicle body 10 such as a door 28.

The engine room 11 is equipped with an engine E/G, a main battery 17, an alternator 18, a starter (ST) 19, electric components 20 and 20B, and the like. The main battery 17, the alternator 18, and the like correspond to the main power source of this vehicle. As a backup of this main power source, a sub-battery 26 is provided in the vehicle interior 13.

Also in the configuration illustrated in FIG. 3, the above-described backbone control boxes 31, 32, and 33 and the backbone trunk line portions 21, 22, and 23, which are electrically connected to each other, are installed in an instrument panel portion 12 in the vehicle interior 13. Further, the back end of the backbone trunk line portion 23 extends to the luggage room 14 and is connected to the backbone control box 35. A backbone control box 34 is installed in an intermediate portion of the backbone trunk line portion 23, and the backbone control box 36 and the sub-battery 26 are connected to the trunk line branched from the backbone control box 34. Various electric components in the luggage room 14 are connected to the backbone control box 35 via the branch line sub-harness 45.

Since it is assumed that the sub-battery 26 exists in the configuration illustrated in FIG. 3, each of the backbone trunk line portions 21, 22, and 23 includes a main power source system and a sub (backup) power source system as power source lines.

Also in the configuration illustrated in FIG. 3, the backbone control box 31 in the vehicle interior 13, the main battery 17, the alternator 18 which are the main power sources in the engine room 11 are connected via the main power source cable 41. Therefore, the main power source cable 41 is routed so as to penetrate the dash panel 16.

A part of the branch line sub-harness 42 connected to the backbone control box 31 disposed in the vehicle interior 13 penetrates the dash panel 16 and is connected to the electric component 20. A part of the branch line sub-harness 44 connected to the backbone control box 33 disposed in the vehicle interior 13 penetrates the dash panel 16 and is connected to the electric component 20B (load).

<Advantages of Vehicular Circuit Body>

As illustrated in FIGS. 1 and 3, the backbone trunk line portions 21 to 23 and the backbone control boxes 31 to 33, which are main components of the vehicular circuit body, are provided in a region inside the vehicle interior 13. The electrical connection components penetrating through the dash panel 16 are realized by connecting the main power source cable 41, the branch line sub-harnesses 42 to 44, and the like, which are different from the backbone having a structure of being large in shape and unlikely to be bent, to the backbone control boxes 31 to 33. Therefore, in the operation of providing the vehicular circuit body on the vehicle body, it is possible to realize a desired electrical connection without deteriorating the performance of the sealing the portion penetrating through the dash panel 16 and without deteriorating the workability. Moreover, by using the vehicular circuit body having a structure which is simplified like a spine, manufacturing costs for devices and costs for routing operations may be reduced. In addition, since it is unnecessary to change the basic configuration for the presence or absence of optional electric components and for new electrical components to be added, it is easy to share components and configurations.

Here, the features of the embodiment of the vehicular circuit body according to the present invention described above are summarized briefly in the following [1] to [5], respectively.

[1] A vehicular circuit body provided in a vehicle, including:
a plurality of control units (backbone control boxes 31 to 33) that are disposed in a first region (vehicle interior 13);
a trunk line (backbone trunk line portions 21 to 23) that is disposed in the first region, and that connects the plurality of control units to each other; and
a first branch line (branch line sub-harnesses 42 and 44) that connects one of the plurality of control units to an accessory (electric components 20 and 20B) that is disposed in the first region or a second region (engine room 11 and door 28) that is different from the first region, in which
the trunk line has a power source line (21a) having a predetermined current capacity and a communication line (21c) having a predetermined communication capacity,
power is supplied from a power source (main battery 17 and alternator 18) to the power source line, and
the control unit distributes the power that is supplied to the power source line, to the first branch line.

[2] In the vehicular circuit body according to the above [1],
the first branch line has a communication line, and extends from the first region to the second region.

[3] In the vehicular circuit body according to the above [1] or [2], the vehicular circuit body further includes a second branch line (main power source cable 41) that is able to connect to the control unit, in which
the second branch line has at least a power source line (41a), and extends from the first region to the second region,
the control unit includes a relay circuit (31d) that performs relaying between the power source line of the trunk line, and the power source line of the second branch line, and
a sectional area of the second branch line is smaller than a sectional area of the trunk line.

[4] In the vehicular circuit body according to the above [3],
the relay circuit has an interrupting function with respect to abnormality of a current which flows between the trunk line and the second branch line.

[5] In the vehicular circuit body according to any one of the above [1] to [4],
the first region is a vehicle interior of the vehicle, and
the second region is an engine room of the vehicle or a movable body that configures a part of a vehicle body.

While the present invention is described in detail by referring to the specific embodiments, it is to be understood to a person with ordinary skill in the art that various changes or modifications may be made without deviating from the spirit and scope of the present invention.

This application is based on Japanese Patent Application (Japanese Patent Application No. 2016-125287) filed on Jun. 24, 2016, the contents of which are incorporated herein by reference.

INDUSTRIAL APPLICABILITY

According to the present invention, it is possible to provide a vehicular circuit body that may simplify the configuration of the trunk line portion and may easily add new wires. The present invention which exerts this effect is useful with respect to a vehicular circuit body routed in a vehicle.

REFERENCE SIGNS LIST

10: vehicle
11: engine room
12: instrument panel portion
13: vehicle interior
14: luggage room
16: dash panel
16a: penetration hole
17: main battery
18: alternator
19: starter
20, 20B: electric component
21, 22, 23: backbone trunk line portion
21a: power source line
21b: earth line
21c: communication line
26: sub-battery
28: door
31, 32, 33, 34, 35, 36: backbone control box
31a: main power source connection portion
31b: trunk line connection portion
31c: branch line connection portion
31d: relay circuit
41: main power source cable
41a: power source line
41b: earth line 42, 43, 44, 45: branch line sub-harness
51, 52, 53: electronic control unit

The invention claimed is:

1. A vehicular circuit body provided in a vehicle that includes an engine room, a vehicle interior, a dash panel that separates the engine room from the vehicle interior, and a floor that extends along the vehicle interior, the vehicular circuit body comprising:
a plurality of control units that are disposed the vehicle interior;
a trunk line that is disposed in the vehicle interior, and that connects the plurality of control units to each other; and
a first branch line that connects one of the plurality of control units to an accessory that is disposed in the vehicle interior or the engine room that is different from the vehicle interior,
wherein the trunk line has a power source line having a predetermined current capacity and a communication line having a predetermined communication capacity,
wherein power is supplied from a power source to the power source line,
wherein the one of the control units distributes the power that is supplied to the power source line, to the first branch line,
wherein the plurality of control units are mounted on the dash panel,
wherein a sectional area of the first branch line is smaller than a sectional area of the trunk line,
wherein the first branch line extends from the vehicle interior to the engine room through a penetration hole of the dash panel,
wherein the trunk line includes a first trunk line portion that extends linearly in a left-right direction along the dash panel, and a second trunk line portion that extends along the dash panel and the floor at a center portion of the vehicle in the left-right direction of the vehicle,
wherein the plurality of control units includes a first control unit, a second control unit, and a third control unit on the dash panel and spaced away from the floor,
wherein the trunk line includes a third trunk line portion that extends linearly in the left-right direction along the dash panel,
wherein the first trunk line portion extends from the first control unit to the second control unit
wherein the second trunk line portion extends from the second control unit, and
wherein the third trunk line portion extends from the second control unit to the third control unit.

2. The vehicular circuit body according to claim 1, wherein the first branch line has a communication line.

3. The vehicular circuit body according to claim 1, further comprising:
a second branch line that is connected to the one of the control units,
wherein the second branch line has at least a power source line, and extends from the vehicle interior to the engine room,
wherein the one of the control units includes a relay circuit that performs relaying between the power source line of the trunk line and the power source line of the second branch line, and
wherein a sectional area of the second branch line is smaller than a sectional area of the trunk line.

4. The vehicular circuit body according to claim 3, wherein the relay circuit has an interrupting function with respect to abnormality of a current which flows between the trunk line and the second branch line.

5. The vehicular circuit body according to claim 1, wherein the trunk line extends along the floor and along the dash panel.

6. The vehicular circuit body according to claim 1, further comprising:
a fourth control unit located on the floor and spaced away from the dash panel, and
wherein the second trunk line portion extends from the second control unit to the fourth control unit.

* * * * *